United States Patent

Ueda et al.

Patent Number: 5,276,769
Date of Patent: Jan. 4, 1994

[54] NEURAL NETWORK LEARNING APPARATUS AND METHOD

[75] Inventors: Toru Ueda, Nara; Yasushi Ishizuka, Yamatokoriyama; Fumio Togawa, Nara, all of Japan

[73] Assignee: Sharp Kabushiki Kaisha, Osaka, Japan

[21] Appl. No.: 924,585

[22] Filed: Aug. 6, 1992

Related U.S. Application Data

[63] Continuation of Ser. No. 491,732, Mar. 12, 1990, abandoned.

[30] Foreign Application Priority Data

Mar. 13, 1989 [JP] Japan .................... 1-60327

[51] Int. Cl.$^5$ .............................................. G06F 15/18
[52] U.S. Cl. .......................................... 395/23; 395/24
[58] Field of Search ................................ 395/22, 23, 24

[56] References Cited

U.S. PATENT DOCUMENTS

| | | | |
|---|---|---|---|
| 4,914,603 | 4/1990 | Wood | 364/513 |
| 4,918,618 | 4/1990 | Tomlinson, Jr. | 364/807 |
| 5,058,184 | 10/1991 | Fukushima | 395/22 |

OTHER PUBLICATIONS

"Parall distributed Processing", vol. 1, ch-8-, Rumelhart et al, 1986.
"An Introduction to Computing with Neural Nets", Richard P. Lippmann, IEEE ASSP Mag., Apr. 1987.
"Statistical Pattern Recognition with Neural Networds: Benchmarking Studies" by T. Kohonen et al, vol. I, pp. 61-68, Jul. 1988.
"An Introduction to Neural Computing" by T. Kohonen.

*Primary Examiner*—Allen R. MacDonald
*Assistant Examiner*—George Davis

[57] ABSTRACT

A learning apparatus for use in a neural network system which has a plurality of classes representing different meanings. The learning apparatus is provided for learning a number of different patterns, inputted by input vectors, and classified in different classes. The learning apparatus is constructed by a computer and it includes a section for producing a plurality of output vectors representing different classes in response to an input vector, a section for obtaining a first largest output vector of all the output vectors, a section for obtaining a second largest output vector of all the output vectors, and a section for setting predetermined weights to the first and second largest output vectors, respectively, such that the first largest output vector is made larger, and the second largest output vector is made smaller. Furthermore, a section for determining a ratio of the weighted first and second largest output vectors, respectively, is included. If the determined ratio is smaller than a predetermined value, the weighted first and second largest output vectors are further weighted to be made further larger and smaller, respectively.

22 Claims, 6 Drawing Sheets

Fig. 6

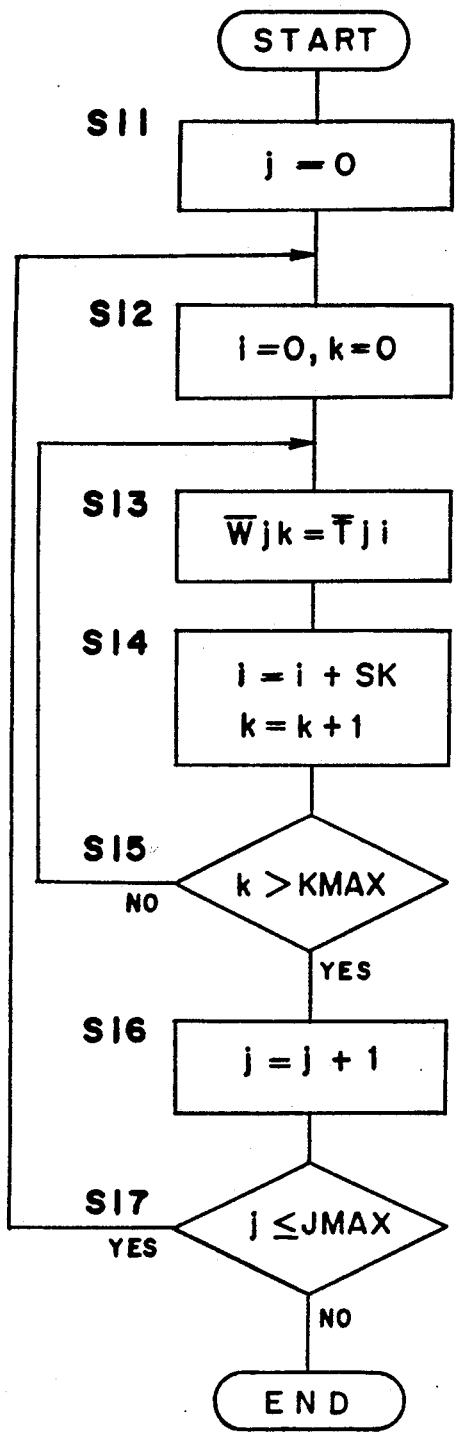

j : Class No.

i : Number of the learning vector that belongs to one class k : Number of the weight vector assigned to one class $\overline{T}_{ji}$ : i-th learning vector that belongs to j-th class $\overline{W}_{jk}$ : k-th weight vector assigned to j-th class SK : A constant for determining the sampling rate of learning vector to which the weight vector is set KMAX : Number of weight vectors assigned to one class JMAX : Number of classes

NEURAL NETWORK LEARNING APPARATUS AND METHOD

This application is a continuation of application Ser. No. 07/491,732 filed on Mar. 12, 1990, now abandoned.

BACKGROUND OF THE INVENTION

1. Field of the Invention

The present invention relates to a learning apparatus and method of an artificial neural network.

2. Description of the Background

Conventionally, a teacher-supervised learning method of a neural network is carried out as follows. For learning a fact that one input data should be assigned to a class presently being observed, learning is carried out only when the input data is not assigned to the class being observed. In other words, when the input data shows the largest output value for the class being observed, learning will be carried out. Such a method is disclosed, for example, in a report "Statistical Pattern Recognition with Neural Networks: Benchmarking Studies" by T. Kohonen, G. Barna and R. Chrisley in IEEE, Proc. of ICNN, Vol I, pp 61–68, July 1988.

As described above, according to the learning method of the neural network, when a learning data is inputted, learning is carried out only when the output node, which is not assigned to the class in which the learning data should belong, produces a largest output value. In other words, with respect to all the learning data, when the output node assigned to the class to which the learning data belongs produces the largest output, learning is ended. After learning, the neural network can classify a data which is unlearned, but similar to the earned data, into a proper class. Therefore, according to the conventional art learning apparatus or method, the neural network can provide a high recognition ability for unlearned data, provided that a variety of sufficient patterns of learning data are used for learning one class.

However, when very few learning data are used, or when a large amount of learning data with less variation in pattern change are used for learning one class, the neural network can not provide a high recognition ability after learning.

SUMMARY OF THE INVENTION

The present invention has been developed with a view to substantially solving the above described disadvantage and has for its essential object to provide an improved neural network learning apparatus and method that can provide a high recognition ability even when very few learning data are used.

In accomplishing these and other objects, a neural network learning apparatus according to the present invention comprises means for producing a plurality of output vectors representing different classes in response to an input vector; first obtaining means for obtaining a first largest output vector of all the output vectors, second obtaining means for obtaining a second largest output vector of all the output vectors, and weight vector setting means for setting predetermined weights to the first and second largest output vectors, respectively, such that the first largest output vector is made larger, and the second largest output vector is made smaller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with a preferred embodiment thereof with reference to the accompanying drawings which are given by way of illustration only and thus are not limitative of the present invention, and throughout which like parts are designated by like reference numerals, wherein:

FIG. 6 is a flow chart for carrying out the initial setting of the weight vector;

DETAILED DESCRIPTION OF THE PREFERRED EMBODIMENTS

Figure 1:
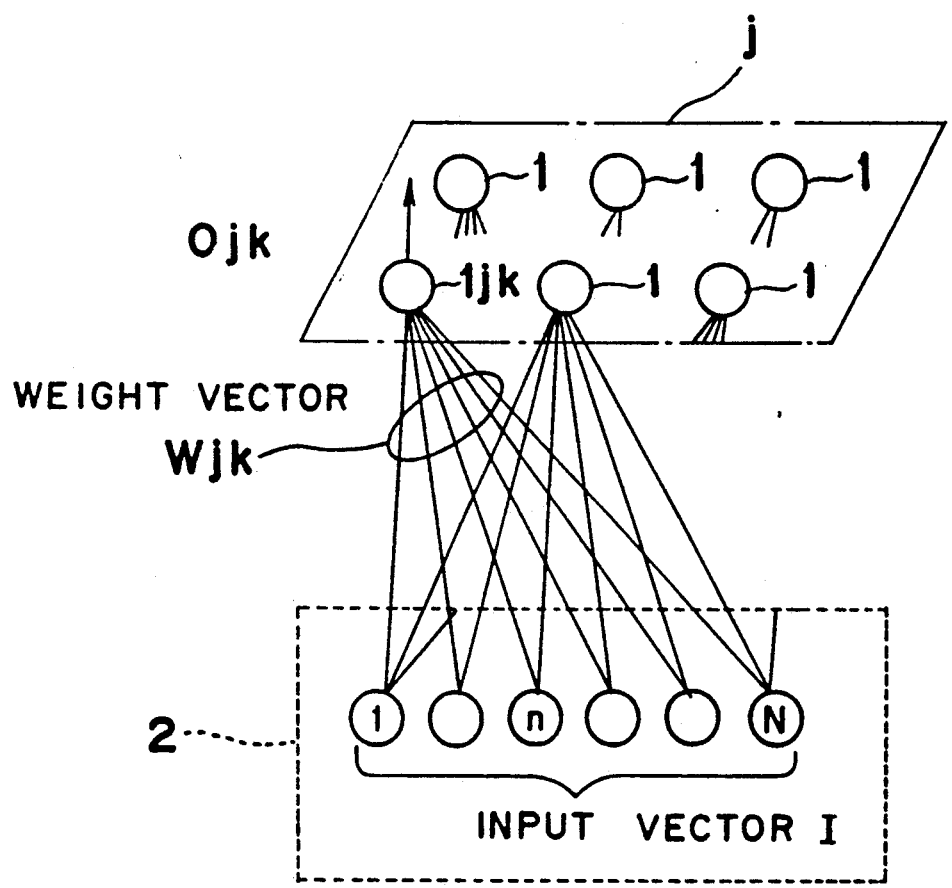
FIG. 1 is a diagrammatic view of a Kohonen type neural network.

Referring to FIG. 1, a diagram of a Kohonen type neural network is shown.

The Kohonen type neural network has such a structure that all the output nodes 1 are linked with input nodes 2. The output nodes 1 are each assigned to one of different classes. The output node 1 is expressed by a first subscript number j representing the assigned class and a second subscript number k representing the number of output nodes contained in the class. For example, an output node $1_{jk}$ represents an output which is a k-th output node in j-th class. Input node 2 is provided with N-th dimension input vector I. Based on the input vector I and weight vector W, a output O is produced according to an algorithm (1) which will be described later. The calculated output O is produced from each output node 1. Then, the class in which the output node with largest output value is contained is recognized as the class to which the input data belongs. Here, the weight vector W is provided correspondingly to the input node I, so that the weight vector is expressed by a first subscript number j representing the assigned class and a second subscript number k representing the number of output nodes contained in the class.

The algorithm used for obtaining the output O is the algorithm used in the Kohonen type neural network. Although there are a number of methods to set the initial value of the weight vector W, the present embodiment employs input vector I as the initial value of the weight vector W. When an i-th input vector I(t) is applied through the input node, an output $O_{jk}(t,u)$ from output node $1_{jk}$ can be given by the following equation (1):

$$O_{jk}(t,u) = \sum_{n=1}^{N} \{\overline{I}(t) \cdot \overline{W}_{jk}(u)\} \quad (1)$$

wherein: n is a dimension of the input vector I ($1 \leq n \leq N$); t is a number of input vector I; u is the number of learning procedure; j is the number of the class; and k is the number within the class j.

In the present embodiment, the weights W are changed so that the output node assigned to the class in which the input vector I belongs produces the largest output.

The neural network learning method of the present embodiment of the present invention includes: a first learning procedure which is carried out when the output node producing the largest output value in response to the input of the learning vector to the input node 2 is not assigned to the class in which the learning vector belongs; and a second learning procedure which is carried out after the first learning procedure. The first learning procedure is already known in the art, but the second learning procedure is outstanding and newly provided by the present application. Each of the first and second learning procedures will be explained below.

(A) First Learning Procedure

The first learning procedure is carried out after the initial setting. The first learning procedure employs the learning vector quantization II (LVQ2) which is the known learning method for the Kohonen type neural network and is disclosed in the above-mentioned article "Statistical Pattern Recognition with Neural Network". In the LVQ2, weight vector W is varied in accordance with the output O produced in response to the input of the learning vector I, which is the input vector I, in a manner shown by equation (2).

When the first largest output value and the second largest output value are expressed as $O_{j1k1}(t,u)$ and $O_{j2k2}(t,u)$, respectively, for the input vector $I(t)$, and if j1 represents a class other than the class in which the input vector I belongs, and j2 represents a class in which the input vector I belongs, the weight vectors (u) and $W_{j2k2}(u)$ are changed to $W_{j1k1}(u+1)$ and $W_{j2k2}(u+1)$, respectively, by the following equation (2).

$$\begin{bmatrix} \overline{W}_{j1k1}(u+1) = \overline{W}_{j1k1}(u) - K_1\{\overline{I}(t) - \overline{W}_{j1k1}(u)\} \\ \overline{W}_{j2k2}(u+1) = \overline{W}_{j2k2}(u) + K_1\{\overline{I}(t) - \overline{W}_{j2k2}(u)\} \end{bmatrix} \quad (2)$$

In equation (2), j1 is a class number to which an output node with the largest output value is assigned; k1 is a number of the output node with the first largest output value in class j1; j2 is a class number to which an output node with the second largest output value is assigned; k2 is a number of the output node with the second largest output value in class j2; and K1 is a constant or a variable which is reduced relatively to the increase of the learning operations.

Thus, the first learning procedure is used in such a case that the recognition of the input I(t) based on the output node with the first largest output value is incorrect and that the recognition should be carried out based on the output node with the second largest output value. In such a case, the weight vector W for the output node producing the first largest output value is changed to a smaller amount and the weight vector W for the output node producing the second largest output value is changed to a larger amount.

After such a change is effected in the weight vectors and if the same amount of input, for example $I(t+1) = I(t)$, is applied, the output node, from which the first largest output value was produced, would produce a reduced output value; and the output node, from which the second largest output value was produced, would produce an increased output value. In such a case, the following relationship can be obtained:

$$O_{j2k2}(t,u+1) > O_{j2k2}(t,u)$$

$$O_{j1k1}(t,u+1) < O_{j1k1}(t,u)$$

The decrease and the increase of the first largest and the second largest output values are effected such that the output node, from which the first largest output value was produced, would produce the second largest output value; and the output node, from which the second largest output value was produced, would produce the first largest output value. Accordingly, the output node assigned to the class in which the input vector I belongs produces the largest output value. Thus, based on the largest output value, the class of the input vector can be properly recognized.

The above algorithm is carried out to correct a case when the output node assigned to the class in which the input vector I belongs produces the second largest output.

The above algorithm is diagrammatically explained in connection with FIG. 2.

Figure 2:
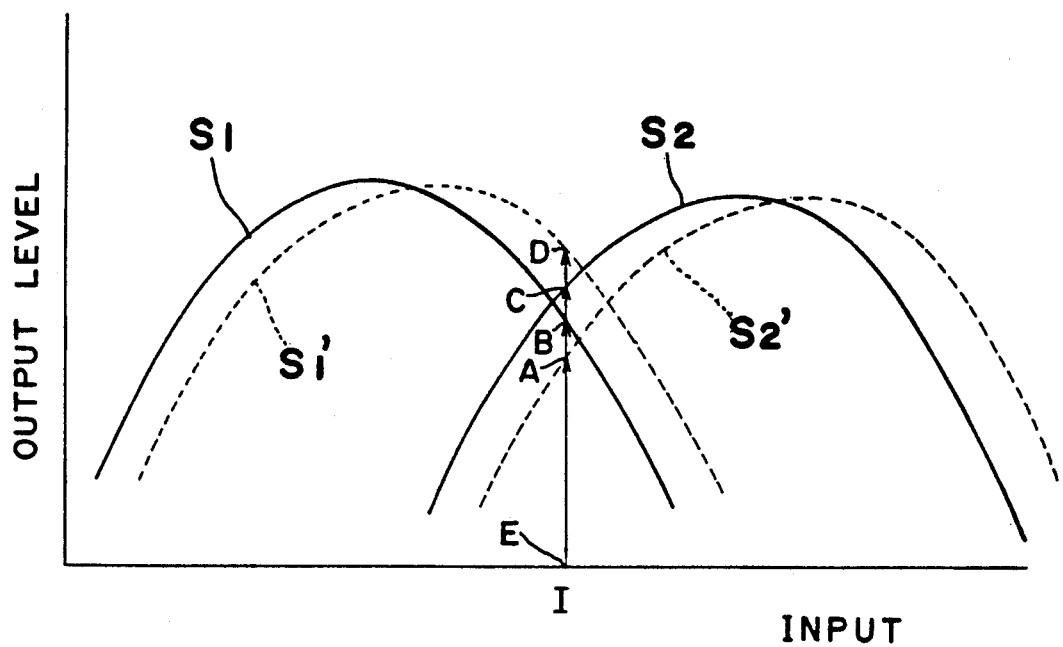
FIG. 2 is a graph showing an operation according to a first learning procedure.

Referring to FIG. 2, a one-dimensional two-class case is shown. Before the change effected by equation (2), the two classes are represented by real line curves S1 and S2, and after the change effected by equation (2), the two classes are represented by dotted lines S1' and S2'. Assume that input I belongs to the class shown by the curve S1. When the real line curves are considered, the first largest output value is EC, and the second largest value is EB. If the first learning procedure is not performed, a line S2 designated by the largest output value is used for recognizing the input I. However, since this recognition is wrong, the first learning procedure is performed by instructions obtained from a teacher who first decides whether or not the recognition is correct. By the first learning procedure effected by equation (2), the lines S1 and S2 are shifted rightwardly to the positions shown by dotted lines S1' and S2'. Thus, after the first learning procedure, the input I is analyzed in accordance with the dotted lines. Thus, the first largest value is ED, and the second largest value is EA. Therefore, by the first learning procedure effected by equation (2), the first largest output value EC is changed to the second largest output value EA, and the second largest output value EB is changed to the first largest output value ED. Thus, after the first learning procedure, a line S1' designated by the first largest output value is used for recognizing the input I. Thus, the input I can be correctly recognized.

In the above algorithm, the weight vectors can be changed for all the cases wherein the output node assigned to the class in which the input vector I belongs does not produce the largest value. When such changes are effected, the output node assigned to the class in which the input vector I belongs can take the first largest value with respect to all the input vectors I. Therefore, the greater the number of input vectors I used, the higher in degree the first learning procedure is completed. When the lesser number of input vectors I are used for the first learning procedure, such a neural network will not show a high recognition ability with respect to unlearned data. For such a neural network, the second learning procedure is provided for increasing the recognizing ability.

(B) Second Learning Procedure

The second learning procedure is carried out after the first learning procedure or after the initial setting, so as to improve the recognition ability by the use of equation (3).

Of the outputs produced from output nodes in response to the input of input vector I(t), the first largest output value given by:

$$O_{j1k1}(t,u),$$

and the second largest output value given by:

$$O_{j2k2}(t,u)$$

are detected. It is further detected that ji is equal to the class number in which the input vector I belongs and j2 is no equal to the class number in which the input vector I belongs.

Then, it is detected whether or not a ratio of $O_{j1k1}(t,u)$ to $O_{j2k2}(t,u)$ is smaller than a predetermined amount T which is selected between 1 an 1.5, which is preferably about 1.2. If the detected result is such that:

$$O_{j1k1}(t,u)/O_{j2k2}(t,u) < T,$$

the weight vectors $W_{j1k1}(u)$ and $W_{j2k2}(u)$ are changed by the following equation (3):

$$\begin{bmatrix} \overline{W}_{j1k1}(u+1) = \overline{W}_{j1k1}(u) + K_2\{I(t) - \overline{W}_{j1k1}(u)\} \\ \overline{W}_{j2k2}(u+1) = \overline{W}_{j2k2}(u) - K_2\{I(t) - \overline{W}_{j2k2}(u)\} \end{bmatrix} \quad (3)$$

in which K2 is a constant or a variable which is reduced relatively to the increase of the learning operations.

By the second learning procedure, the weight vectors W are changed such that the first largest value produced from the output node assigned to the class in which the input vector I belongs is made further larger, and at the same time, the second largest value produced from the output node assigned to a class different than the above class is made further smaller. Therefore, the difference between the first largest and the second largest values are made greater.

Thus, after the second learning procedure, the recognizing ability of the class as obtained by the initial setting or by the first learning procedure is further enhanced. Therefore, even when the first learning procedure is omitted, or performed with a small number of learning input vectors, or performed with a large number of learning input vectors, but with very small variations, it is possible to recognize an unlearned input vector with high reliability.

The above algorithm is carried out when the output node assigned to the class in which the input vector I belongs produces the largest output.

The above algorithm is diagrammatically explained in connection with FIG. 3.

Figure 3:
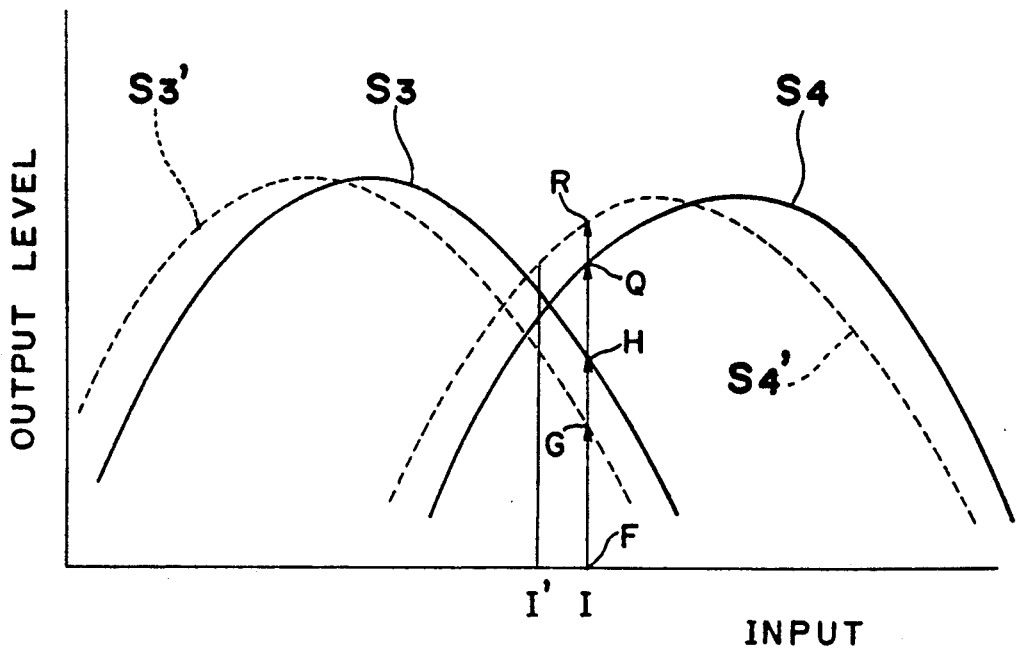
FIG. 3 is a graph showing an operation according to a second learning procedure.

Referring to FIG. 3, a one-dimensional two-class case is shown. Before the change effected by equation (3), the two classes are represented by real line curves S3 and S4, and after the change effected by equation (3), the two classes are represented by dotted lines S3' and S4'. Assume that input I belongs to the class shown by the curve S4. When the real line curves are considered, the largest output value is FO, and the second largest value is FH. If the second learning procedure is not performed, a line S4 designated by the largest output value is used for recognizing the input I. Although the recognition of I is carried out correctly, another input pattern I', which is similar to I and belongs to the same class as the input I, can not be detected correctly. To enable the recognition of such an input pattern I', the boundary (the crossing point of curves S4 and S3) of class represented by curve S4 is shifted to broaden the class of curve S4. According to the present invention, the broadening process is carried out such that when the input I is correctly recognized but with a very small distinguishable feature, the recognition of such a small distinguishable feature is emphasized. According to the present invention, when the ratio $O_{j1k1}(t,u)/O_{j2k2}(t,u)$ (=FQ/FH) is smaller than the predetermined amount T (for example 1.2), it is so evaluated that the input I has a small distinguishable feature. Thus, according to the present invention, the weight vector is changed so that the first largest output value is made further larger, and the second largest output value is made further smaller, thereby making the difference between the first and second largest output values greater.

Thus, by the second learning procedure effected by equation (3), the lines S3 and S4 are shifted leftwardly to the positions shown by dotted lines S3' and S4'. Thus, after the second learning procedure, even an input I' which has a less distinguishable feature than input I can be recognized as the class of line S4. Therefore, recognition ability is improved.

Figure 4:
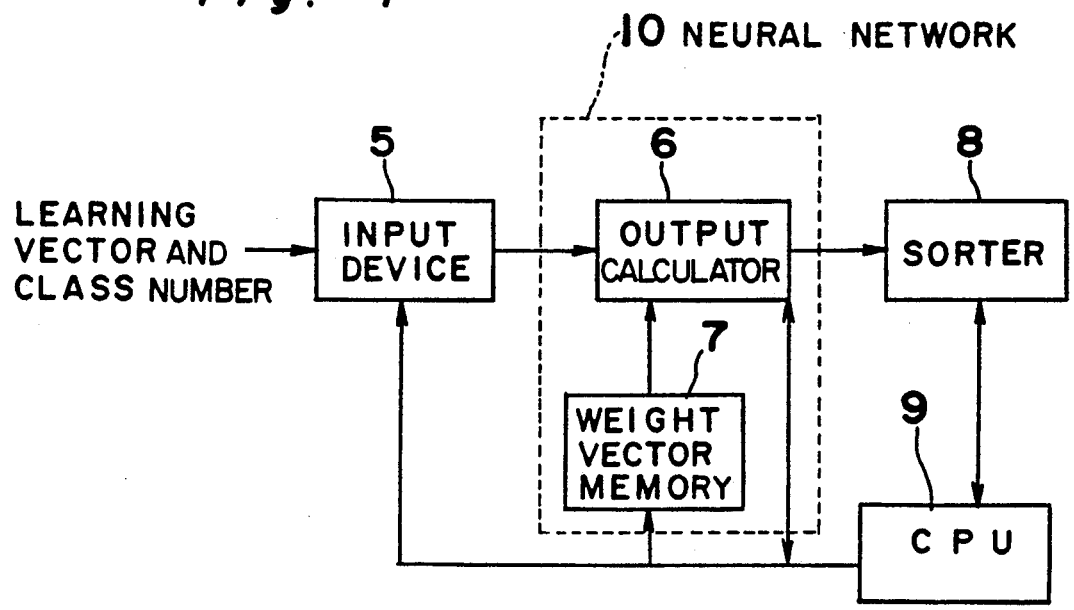
FIG. 4 is a block diagram of an artificial neural network for carrying out a learning method of the present invention.

Referring to FIG. 4, a block diagram of a learning system based on the neural network of the present invention is shown. Input device 5 receives the input vector I as the learning vector and the class number, or name, to which the input vector I belongs. Output calculator 6 is provided for calculating the inner product (the calculated result is produced as an output O from output node of neural network) of input vector I and the weight vector stored in weight vector memory 7. The calculated results obtained from output calculator 6 are applied to a sorter 8 in which the outputs are aligned from the largest output to the smallest output, and are stored in a memory. CPU 9 is provided for controlling input device 5, output calculator 6, weight vector memory 7 and output sorter 8 for carrying out the following learning operation. The output calculator 6 and weight vector memory 7 constitutes a portion of a neural network 10 which will be learned according to the present invention.

At the start of the learning, CPU 9 controls the system such that the input vector I applied to input device 5 is stored in weight vector memory 7 as an initial value of the weight vector. Also, during the learning period, the weight vectors stored in weight vector memory 7 are changed in a manner described later in consideration of the calculated result stored in sorter 8 in the order from greater ones to smaller ones.

Figure 5:
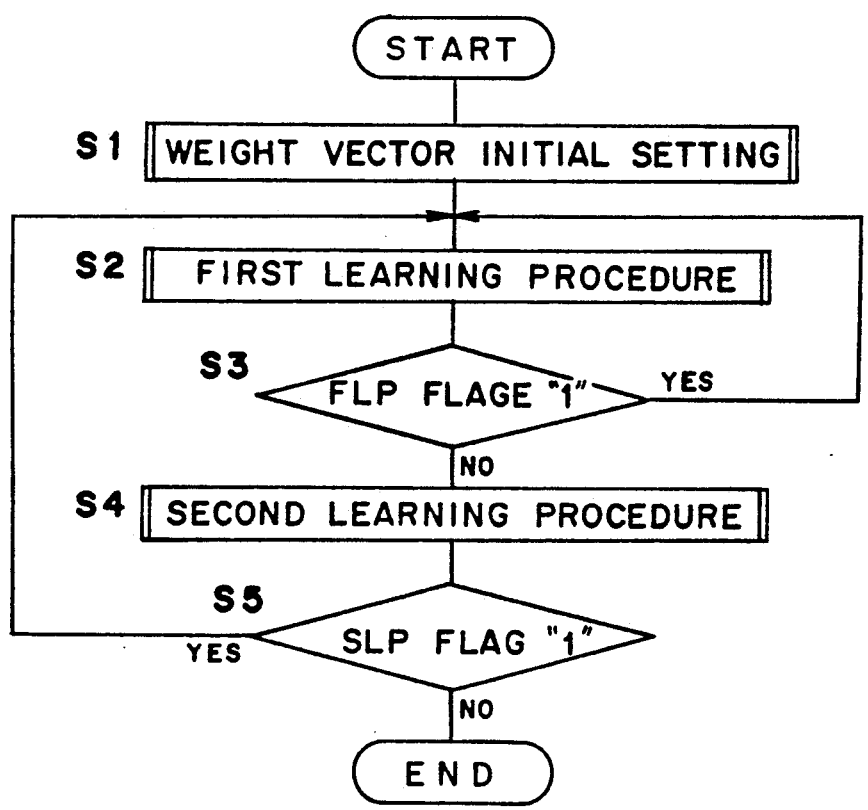
FIG. 5 is a flow chart for carrying out the learning operation controlled by CPU 9 shown in FIG. 4.

Referring to FIG. 5, a flow chart for carrying out the learning operation controlled by CPU 9 is shown At step S1, the initial setting of the weight vectors is carried out.

At step S2, the first learning procedure is carried out.

At step S3, it is detected whether the first learning procedure is carried out, or not, by check of a first learning procedure flag (FLP flag). If the FLP flag is of value "1", indicating that the weight vectors have been changed according to equation (2), the program returns back to step S2 to repeat the first learning procedure. If the FLP flag is of value other than "1", indicating that the first learning procedure is completed, the program goes to step S4.

At step S4, the second learning procedure is carried out.

At step S5, it is detected whether second learning procedure is carried out, or not, by the check of a second learning procedure flag (SLP flag). If the SLP flag is of value "1", indicating that the weight vectors have been changed according to equation (3), the program returns back to step S2 to be repeated from the first learning procedure. If the SLP flag is not of value "1", indicating that the second learning procedure is completed, the program ends.

Referring to FIG. 6, a flow chart of the subroutine S1 for the initial setting of the weight vector is shown.

At step S11, the class number j is set to the initial value "0".

At step S12, the number i of the learning vector that belongs to one class and the number k (the same number is used for the corresponding output node) of the weight vector assigned to one class are set to the initial value "0".

At step S13, the initial value of the weight vector $W_{jk}$ is set to the learning vector $T_{ji}$.

Note that $W_{jk}$ represents k-th weight vector of the weight vectors assigned to j-th class, and $T_{ji}$ represents i-th learning vector of all the learning vectors that belong to j-th class (provided that $i > k$).

At step S14, SK is added to i, and one is added to k. Here, SK is a constant for determining the sampling rate of the learning vectors, in which the sampled learning vector is set with the weight vector. Also k is the number of the weight vector assigned to one class.

At step S15, it is detected whether or not k is greater than KMAX (number of weight vectors assigned to one class). If k is greater than KMAX, the program goes to step S16, and if not, the program returns to step S13.

At step S16, one is added to j.

At step S17, it is detected whether or not j is equal to or less than JMAX (number of classes). If j is equal to or less than JMAX, the program goes to step S12 to carry out the subroutine for the initialization of weight vector W, and if j is greater than JMAX, the subroutine ends.

Figure 7:
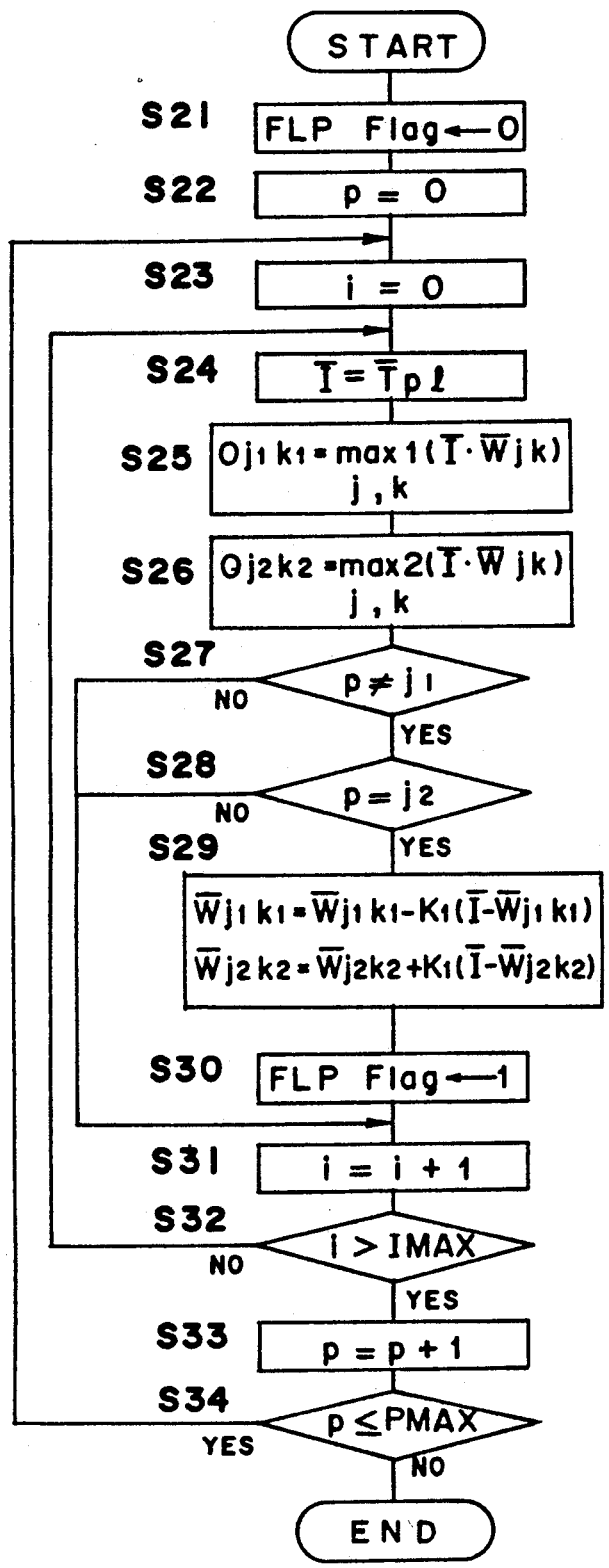
FIG. 7 is a flow chart for carrying out the first learning procedure.

Referring to FIG. 7, a flow chart of the subroutine S2 for the first learning procedure is shown.

At step S21, the first learning procedure flag (FLP flag) is set to 0.

At step S22, the number p of the class to which the learning vector belongs is set to an initial value 0.

At step S23, i is set to the initial value 0.

At step S24, a variable vector I, which is the input vector I, is set equal to the learning vector $T_{pi}$. Vector $T_{pi}$ is the i-th learning vector of all the learning vectors that belong to p-th class.

At step S25, the first largest one of all the inner products of $\overline{I}$ ($= T_{pi}$) and $\overline{W}_{jk}$ (j and k are varied) is obtained and is expressed by the following equation (4):

$$O_{j1k1} = \max_{j,k} 1(\overline{I} \cdot \overline{W}_{jk}) \tag{4}$$

in which max1(f(jk)) represents a maximum of f(jk) when j and k are varied. Also, j1 and k1 represent numbers when the maximum $O_{j1k1}$ is obtained.

At step S26, the second largest one of all the inner products of $\overline{I}$ ($= T_{pi}$) and $\overline{W}_{jk}$ (j and k are varied) is obtained and is expressed by the following equation (5):

$$O_{j2k2} = \max_{j,k} 2(\overline{I} \cdot \overline{W}_{jk}) \tag{5}$$

in which max2(f(jk)) represents a maximum of f(jk) when j and k are varied. Also, j2 and k2 represent numbers when the maximum $O_{j2k2}$ is obtained.

At step S27, it is detected whether j1 is not equal to p or not, i.e., whether the recognized result based on the largest output $O_{j1k1}$ is incorrect or not. If j1 is not equal to p, i.e., the recognized result is incorrect, the program goes to step S28, and if j1 is equal to p, the program goes to step S31.

At step S28, it is detected whether j2 is equal to p or not, i.e., whether the recognized result based on the second largest output $O_{j2k2}$ is correct or not. If j2 is equal to p, i.e., the recognized result is correct, the program goes to step S29, and if j2 is not equal to p, the program goes to step S31.

At step S29, weight vectors $\overline{W}_{j1k1}$ and $\overline{W}_{j2k2}$ are changed according to the following equation (2').

$$\begin{bmatrix} \overline{W}_{j1k1} = \overline{W}_{j1k1} - K_1\{I - \overline{W}_{j1k1}\} \\ \overline{W}_{j2k2} = \overline{W}_{j2k2} + K_1\{I - \overline{W}_{j2k2}\} \end{bmatrix} \tag{2'}$$

At step S30, first learning procedure flag (FLP flag) is set.

At step S31, one is added to i.

At step S32, it is detected whether i is greater than a predetermined number IMAX, representing the total number of learning vectors that belong to one class. If i is greater than IMAX, the program goes to step S33, and if not, the program returns to step S24.

At step S33, one is added to p.

At step S34, it is detected whether p is equal to or smaller than a predetermined number PMAX, representing the total number of classes in which the learning vector belongs. If p is equal to or smaller than PMAX, the program returns to step S23, and if not, the program ends.

Figure 8:
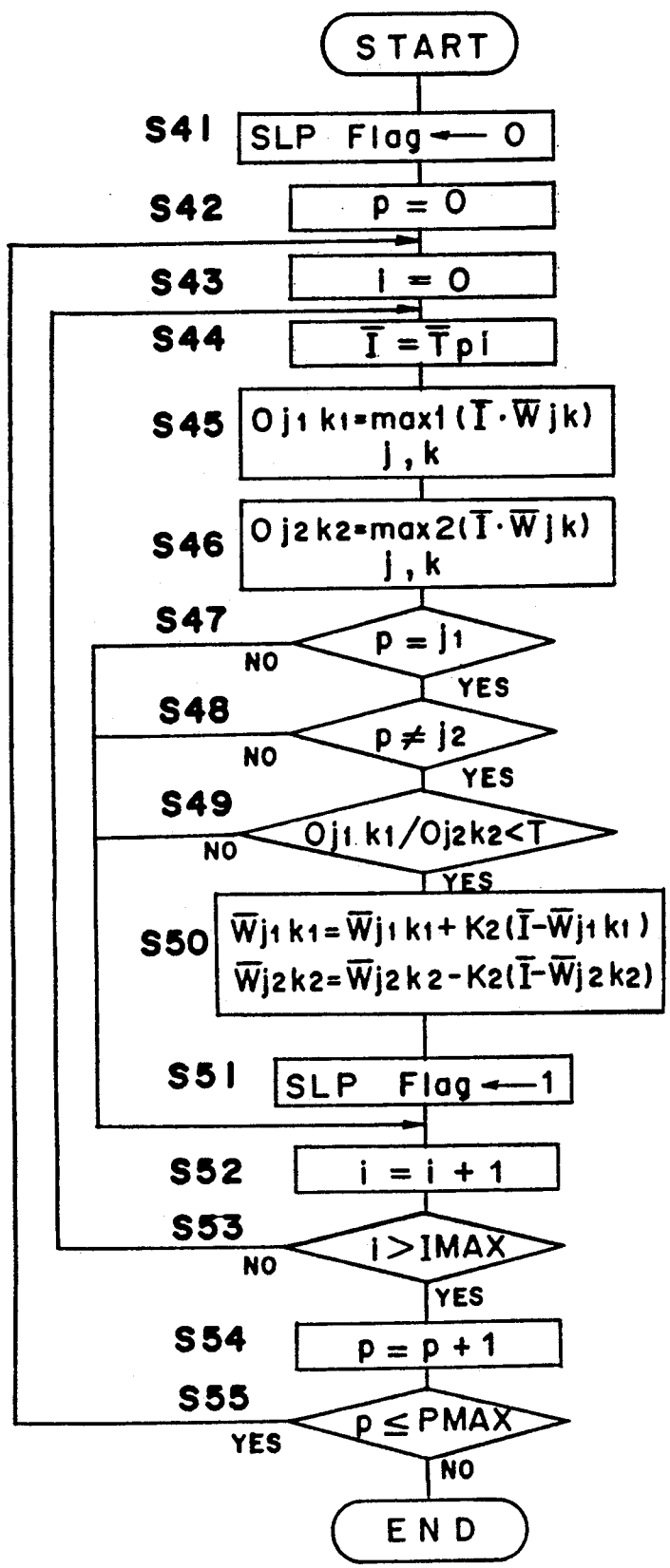
FIG. 8 is a flow chart for carrying out the second learning procedure.

Referring to FIG. 8, a flow chart of the subroutine S4 for the second learning procedure is shown.

At step S41, the second learning procedure flag (SLP flag) is set to 0.

At step S42, the number p of the class to which the learning vector belongs is set to an initial value 0.

At step S43, i is set to the initial value 0.

At step S44, a variable vector $\overline{I}$, which is the input vector $\overline{I}$, is set equal to the learning vector $\overline{T}_{pi}$.

At step S45, the largest one of all the inner products of $\overline{I}$ ($= T_{pi}$) and $\overline{W}_{jk}$ (j and k are varied) is obtained and is expressed by the equation (4).

At step S46, the second largest one of all the inner products of $\bar{I}$ ($=T_{pi}$) and $\overline{W}_{jk}$ (j and k are varied) is obtained and is expressed by the equation (5).

At step S47, it is detected whether j1 is equal to p or not, i.e., whether the recognized result based on the largest output $O_{j1k1}$ is correct or not. If j1 is equal to p, i.e., the recognized result is correct, the program goes to step S48, and if j1 is not equal to p, the program goes to step S52.

At step S48, it is detected whether j2 is not equal to p or not, i.e., whether the recognized result based on the second largest output $O_{j2k2}$ is incorrect or not. If j2 is not equal to p, i.e., the recognized result is incorrect, the program goes to step S49, and if j2 is equal to p, the program goes to step S52.

At step S49, it is detected whether or not a ratio $O_{j1k1}(t,u)/O_{j2k2}(t,u)$ is smaller than a predetermined amount T ($1 < T < 1.5$, preferably $T = 1.2$). If the ratio is smaller than T, the program goes to step S50, but if not, the program advances to step S52.

At step S50, weight vectors $W_{j1k1}$ and $W_{j2k2}$ are changed according to the following equation (3').

$$\begin{bmatrix} \overline{W}_{j1k1} = \overline{W}_{j1k1} + K_2\{\bar{I} - \overline{W}_{j1k1}\} \\ \overline{W}_{j2k2} = \overline{W}_{j2k2} - K_2\{\bar{I} - \overline{W}_{j2k2}\} \end{bmatrix} \quad (3')$$

At step S51, the second learning procedure flag (SLP flag) is set.

At step S52, one is added to i.

At step S53, it is detected whether i is greater than a predetermined number IMAX. If i is greater than IMAX, the program goes to step S54, and if not, the program returns to step S44.

At step S54, one is added to p.

At step S55, it is detected whether p is equal to or smaller than a predetermined number PMAX. If p is equal to or smaller than PMAX, the program returns to step S43, and if not, the program ends.

By the present invention, particularly by the algorithm of equation (3) or (3'), the class boundary is widened so that a suspicious input data can also be classified.

As explained above, the first learning procedure is carried out when the correct recognition is based not on the largest output value, but on the second largest output value. However, the first learning procedure can be carried out every time when the recognition based on the largest output value is incorrect. In this case, the correct recognition can be done, may be by the second, third or fourth largest output value, or by a further lower output value.

In the above embodiment, the first learning procedure is explained as carried out by LVQ2, but can be carried out by any other method, such as LVQ.

According to the present invention, the algorithm employed is not limited to those shown by equations (2) and (3), or (2') and (3'). Algorithms other than equation (2) or (2') can be employed as long as weight vectors can be varied so as to enable the correct recognition using the largest output value. Also, algorithms other than equation (3) or (3') can be employed as long as the largest output value is made further larger, and the second largest output value is made smaller.

Also, according to the present invention, it is possible to eliminate steps S2 and S3 shown in FIG. 3.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A learning apparatus for teaching a neural network, including a plurality of input nodes and a plurality of output nodes, each of the plurality of output nodes representing a class with a different meaning, said learning apparatus comprising:

initialization means for providing an input learning vector to the plurality of input nodes of said neural network, said neural network applying a weighting vector to the input learning vector to produce an initial output learning vector at the plurality of output nodes;

first classifying means including, first selecting means for selecting two of the plurality of output nodes with a first and second largest value, first detecting means for detecting if the selected output node with the first largest value represents the class to which the input learning vector belongs, and weight adjusting means for adjusting the weighting vector if the selected output node with the first largest value does not represent the class to which the input learning vector belongs wherein the adjusted weighting vector is applied to the input learning vector to produce an adjusted output learning vector at the plurality of output nodes, said weight adjusting means adjusting the weighting vector until the first largest value represents the class to which the input vector belongs; and second classifying means including, second selecting means for selecting the two of the plurality of output nodes with the first and second largest values, second detecting means for detecting if the selected output node with the first largest value represents the class to which the input learning vector belongs, ratio calculating means for calculating a ratio of the first largest value to the second largest value if the first largest value represents the class to which the input learning vector belongs, and ratio increasing mean for increasing the ratio of the first largest value to the second largest value if the ratio is within a predetermined range.

2. The learning apparatus of claim 1, wherein said initializing means produces the initial output weighting vector according to:

$$O_{jk}(t,u) = \sum_{n=1}^{N} \{\bar{I}(t) \cdot \overline{W}_{jk}(u)\}$$

where
   $O_{jk}(t,u)$ = the initial output vector,
   $\bar{I}(t)$ = the input learning vector, and
   $\overline{W}_{jk}(u)$ = the weighting vector.

3. The learning apparatus of claim 1, wherein said weight adjusting means adjusts the weighting vector according to:

$$W_{j1k1} = W_{j1k1} - K_1\{I - W_{j1k1}\} \text{ and}$$

$$W_{j2k2} = W_{j2k2} + K_1\{I - W_{j1k1}\}$$

where
- $W_{j1k1}$ = the adjusted weighting vector applied to the selected output mode with the first largest value,
- $W_{j2k2}$ = the adjusted weighting vector applied to the selected output mode with the second largest value,
- I = the input learning vector, and
- $K_1$ = is a constant.

4. The learning apparatus of claim 1, wherein the predetermined range is between 1.0 and 1.5.

5. The learning apparatus of claim 4, wherein an optimal value in the predetermined range is 1.2.

6. The learning apparatus of claim 1, wherein said ratio increasing means increases the ratio of the first largest value to the second largest value by adjusting the weighting vector according to:

$$W_{j1k1} = W_{j1k1} + K_2\{I - W_{j1k1}\}$$

$$W_{j2k2} = W_{j2k2} - K_2\{I - W_{j2k2}\}$$

where
- $W_{j1k1}$ = the adjusted weighting vector applied to the selected output mode with the first largest value,
- $W_{j2k2}$ = the adjusted weighting vector applied to the selected output mode with the second largest value,
- I = the input learning vector, and
- $K_2$ = is a constant.

7. A learning apparatus for teaching a neural network, including a plurality of input nodes and a plurality of output nodes, each of the plurality of output nodes representing a class with a different meaning, said learning apparatus comprising:
   initialization means for providing an input learning vector to the plurality of input nodes of said neural network, said neural network applying a weighting vector to the input learning vector to produce an initial output learning vector at the plurality of output nodes; and
   classifying means including,
      selecting means for selecting two of the plurality of output modes with the first and second largest values,
      detecting means for detecting if the selected output node with the first largest value represents the class to which the input learning vector belongs,
      ratio calculating means for calculating a ratio of the first largest value to the second largest value if the first largest value represents the class to which the input learning vector belongs, and
      ratio increasing means for increasing the ratio of the first largest value to the second largest value if the ratio is within a predetermined range.

8. The learning apparatus of claim 7, wherein said initializing means produces the initial output weighting vector according to:

$$O_{jk}(t,u) = \sum_{n=1}^{N} \{\bar{I}(t) \cdot \overline{W}_{jk}(u)\}$$

where
- $O_{jk}(t,u)$ = the initial output vector,
- $\bar{I}(t)$ = the input learning vector, and
- $\overline{W}_{jk}(u)$ = the weighting vector.

9. The learning apparatus of claim 7, wherein the predetermined range is between 1.0 and 1.5.

10. The learning apparatus of claim 9, wherein an optimal value in the predetermined range is 1.2.

11. The learning apparatus of claim 7, wherein said ratio increasing means increases the ratio of the first largest value to the second largest value by adjusting the weighting vector according to:

$$W_{j1k1} = W_{j1k1} + K_2\{I - W_{j1k1}\}$$

$$W_{j2k2} = W_{j2k2} - K_2\{I - W_{j2k2}\}$$

where
- $W_{j1k1}$ = the adjusting weighting vector applied to the selected output mode with the first largest value,
- $W_{j2k2}$ = the adjusted weighting vector applied to the selected output mode with the second largest value,
- I = the input learning vector, and
- $K_2$ = is a constant.

12. A learning method for teaching a neural network, including a plurality of input nodes and a plurality of output nodes, each of the plurality of output nodes representing a class with a different meaning, said learning method comprising the steps of:
   (a) providing an input learning vector to the plurality of input nodes of said neural network, said neural network applying a weighting vector to the input learning vector to produce an initial output learning vector at the plurality of output nodes;
   (b) selecting two of the plurality of output nodes with a first and second largest value;
   (c) detecting if the selected output node with the first largest value represents the class to which the input learning vector belongs;
   (d) adjusting the weighting factor if the selected output node with the first largest value does not represent the class to which the input learning vector belongs wherein the adjusted weighting vector is applied to the input learning vector to produce an adjusted output learning vector at the plurality of output nodes, said step (d) adjusting the weighting vector until the first largest value represents the class to which the input vector belongs;
   (e) selecting the two of the plurality of output nodes with the first and second largest values;
   (f) detecting if the selected output node with the first largest value represents the class to which the input learning vector belongs;
   (g) calculating a ratio of the first largest value to the second largest value if the first largest value represents the class to which the input learning vector belongs; and
   (h) increasing the ratio of the first largest value to the second largest value if the ratio is within a predetermined range.

13. The learning method of claim 12, wherein said step (a) produces the initial output weighting vector according to:

$$O_{jk}(t,u) = \sum_{n=1}^{N} \{\bar{I}(t) \cdot \overline{W}_{jk}(u)\}$$

where
- $O_{jk}(t,u)$ = the initial output vector, $\bar{I}(t)$ = the input learning vector, and
$\bar{W}_{jk}(u)$ = the weighting vector.

14. The learning method of claim 12, wherein said step (d) adjusts the weighting vector according to:

$$\bar{W}_{j1k1} = \bar{W}_{j1k1} - K_1\{I - W_{j1k1}\} \text{ and}$$

$$\bar{W}_{j2k2} = \bar{W}_{j2k2} + K_1\{I - W_{j2k2}\}$$

where
$W_{j1k1}$ = the adjusted weighting vector applied to the selected output mode with the first largest value,
$W_{j2k2}$ = the adjusted weighting vector applied to the selected output mode with the second largest value,
I = the input learning vector, and
$K_1$ = is a constant.

15. The learning method of claim 12, wherein the predetermined range is between 1.0 and 1.5.

16. The learning method of claim 15, wherein an optimal value in the predetermined range is 1.2.

17. The learning method of claim 12, wherein said step (h) increases the ratio of the first largest value to the second largest value by adjusting the weighting vector according to:

$$W_{j1k1} = W_{j1k1} + K_2\{I - W_{j1k1}\}$$

$$W_{j2k2} = W_{j2k2} - K_2\{I - W_{j2k2}\}$$

where
$W_{j1k1}$ = the adjusted weighting vector applied to the selected output mode with the first largest value,
$W_{j2k2}$ = the adjusted weighting vector applied to the selected output mode with the second largest value,
I = the input learning vector, and
$K_2$ = is a constant.

18. A learning method for teaching a neural network, including a plurality of input nodes and a plurality of output nodes, each of the plurality of output nodes representing a class with a different meaning, said learning method comprising the steps of:

(a) providing an input learning vector to the plurality of input nodes of said neural network, said neural network applying a weighting vector to the input learning vector to produce an initial output learning vector at the plurality of output nodes;

(b) selecting two of the plurality of output nodes with the first and second largest values;

(c) detecting if the selected output node with the first largest value represents the class to which the input learning vector belongs;

(d) calculating a ratio of the first largest value to the second largest value if the first largest value represents the class to which the input learning vector belongs; and (e) increasing the ratio of the first largest value to the second largest value if the ratio is within a predetermined range.

19. The learning method of claim 18, wherein said step (a) produces the initial output weighting vector according to:

$$O_{jk}(t,u) = \sum_{n=1}^{N} \{\bar{I}(t) \cdot \bar{W}_{jk}(u)\}$$

where
$O_{jk}(t,u)$ = the initial output vector,
$\bar{I}(t)$ = the input learning vector, and
$\bar{W}_{jk}(u)$ = the weighting vector.

20. The learning method of claim 18, wherein the predetermined range is between 1.0 and 1.5.

21. The learning method of claim 18, wherein an optimal value in the predetermined range is 1.2.

22. The learning method of claim 18, wherein said step (a) increases the ratio of the first largest value to the second largest value by adjusting the weighting vector according to:

$$W_{j1k1} = W_{j1k1} + K_2\{I - W_{j1k1}\}$$

$$W_{j2k2} = W_{j2k2} - K_2\{I - W_{j2k2})\}$$

where
$W_{j1k1}$ = the adjusted weighting vector applied to the selected output mode with the first largest value,
$W_{j2k2}$ = the adjusted weighting vector applied to the selected output mode with the second largest value,
I = the input learning vector, and
$K_2$ = is a constant.

* * * * *